March 13, 1934.　　　J. J. RITTER　　　1,950,930
SCRAPER
Filed April 22, 1932
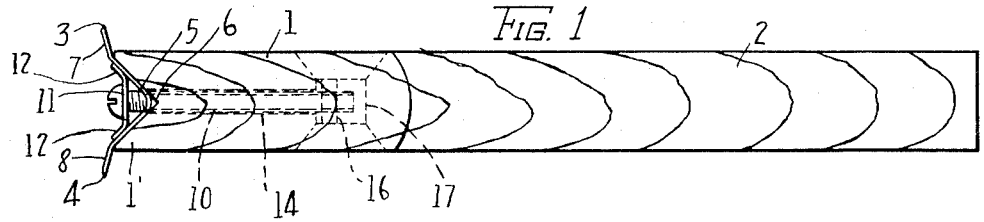
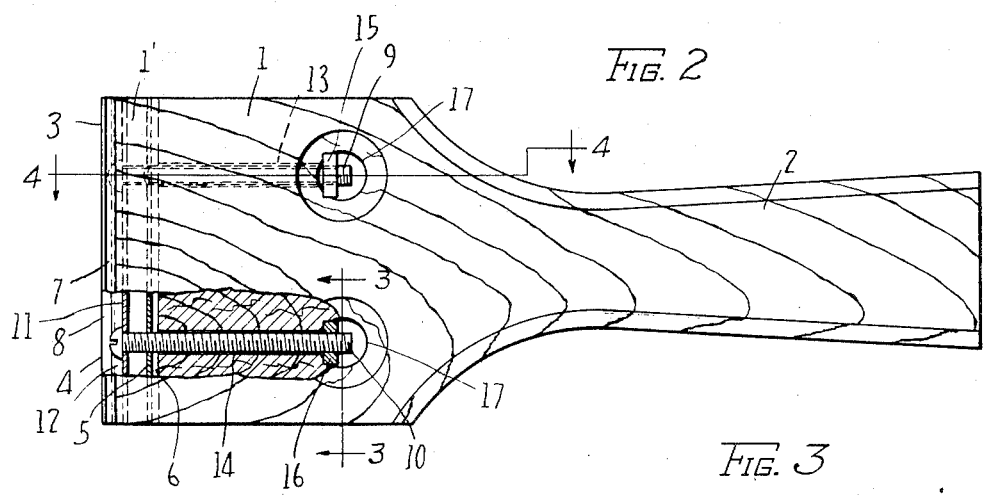
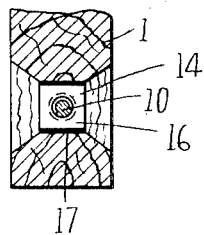
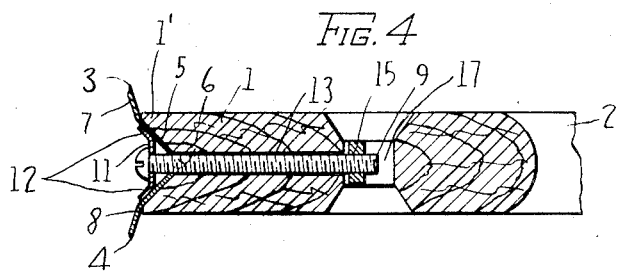
INVENTOR
John J. Ritter
BY
Staley & McLeod
ATTORNEYS Patented Mar. 13, 1934

1,950,930

UNITED STATES PATENT OFFICE 1,950,930

SCRAPER

John J. Ritter, Urbana, Ohio, assignor to The W. B. Marvin Manufacturing Company, Urbana, Ohio, a corporation of Ohio Application April 22, 1932, Serial No. 606,937

3 Claims. (Cl. 306—35)

This invention relates to improvements in scraping tools, and the object of the invention is to devise a handle and scraping elements and means of attaching the latter to the former whereby a simple and inexpensive tool is produced, effective for the purposes for which it is intended.

In the accompanying drawing:

Fig. 1 is a side elevation of the improved tool.

Fig. 2 is a top plan view partly in horizontal section.

Fig. 3 is a fragmentary transverse section on the line 3—3 of Fig. 2.

Fig. 4 is a fragmentary longitudinal section on the line 4—4 of Fig. 2.

Referring to the drawing, the body portion of the tool consists of a flattened head portion 1 and a handle 2 integrally formed therewith, in the present instance of wood. The scraping element is a metallic member which is preferably substantially equal in length to the width of the head 1, and has cutting edges 3 and 4 at the longitudinal edges of the element. The metallic scraper is formed at its longitudinal center with a comparatively deep V-portion 5 so as to be placed in a V-groove 6 formed in the end 1' of the body portion 1, the remaining outer portions of the scraping element being bent forwardly as seen at 7 and 8 to provide that the cutting edges are presented to the work at the most efficient angle.

The scraping element is secured in the V-groove 6 by a plurality of bolts, in the present case there being two, indicated at 9 and 10. The bolts pass through a formed plate 11 of angular cross-section as seen in Fig. 4, the outturned flanges 12 being so shaped as to bear against the inner surfaces of the V-portion 5 of the scraping element and to cause the V-portion of the scraping element to be firmly retained in the V-groove 6 of the head 1. Bolts 9 and 10 are inserted in openings 13 and 14 which are longitudinally disposed in parallel relation in the central portion of the head 1, and are threaded into nuts 15 and 16 which are preliminarily inserted in openings 17 drilled in the flat portion of the head 1, transversely disposed with reference to the longitudinal axis of the bolts 9 and 10; each of these openings being countersunk at each end to permit the person's fingers to be inserted to hold the nut while the screw is being inserted.

By this construction, it will be seen that an inexpensive and simple scraping tool is formed permitting a ready assembly or disassembly and one in which the scraping element is supported in the body portion of the scraper in such manner as to provide a considerable degree of rigidity for the body portion of the scraping element and at the same time to permit of a degree of flexibility to those portions of the scraping element terminating in the cutting edges. It will also be seen that while the scraping element may be ground or sharpened in place the construction is so simple and inexpensive that new scraping elements may be readily substituted for the worn elements. The head portion being wider than the handle provides that the hand of the operator will not come in contact with anything against which the side of the scraper is placed while by the slight angular relation of the cutting edges of the handle portion there is also a provision by which the fingers of the operator are prevented from coming in contact with the surface being scraped.

Having thus described my invention, I claim:

1. In a scraper, a supporting body having a groove in the end thereof, a metallic scraper fitted in said groove, a retaining plate fitted to the scraper, said supporting body having a plurality of longitudinal bores with a transverse opening at the end of each bore, and screws extending through said retaining plate, scraper and bores, and nuts of conventional form for the screws located in the transverse openings and held from turning thereby.

2. In a scraper, a supporting body having a groove in the end thereof, a metallic scraper fitted in said groove, a retaining plate fitted to the scraper, said supporting body having a plurality of longitudinal bores with a transverse opening at the end of each bore, and screws extending through said retaining plate, scraper and bores, and nuts of conventional form for the screws located in the transverse openings and held from turning thereby, each transverse opening having tapered ends.

3. In a scraper, a supporting body formed of wood having a substantially V-shaped groove at one end and a wooden reduced portion forming a handle at the other end, said body having a pair of transverse recesses and a bore leading from each recess to the V-shaped groove, a scraper member having a substantially V-shaped portion fitted to the said V-shaped groove, a retaining plate fitted to the V-shaped portion of said scraper, a pair of bolts extending through said retaining plate, scraper and bores and terminating in the recesses, and a nut of conventional form on the end of each bolt located in the corresponding recess and held from rotation by the walls of said recess.

JOHN J. RITTER.